United States Patent
Goeller

(10) Patent No.: US 11,448,944 B2
(45) Date of Patent: Sep. 20, 2022

(54) MOLDABLE AND FLEXIBLE MOUNT FOR A CURVED SURFACE

(71) Applicant: Christian A. Goeller, Gilbert, AZ (US)

(72) Inventor: Christian A. Goeller, Gilbert, AZ (US)

( * ) Notice: Subject to any disclaimer, the term of this patent is extended or adjusted under 35 U.S.C. 154(b) by 0 days.

(21) Appl. No.: 17/145,331

(22) Filed: Jan. 9, 2021

(65) Prior Publication Data

US 2022/0221774 A1 Jul. 14, 2022

(51) Int. Cl.
| | | |
|---|---|---|
| G03B 17/56 | (2021.01) | |
| F16M 13/02 | (2006.01) | |
| B62J 11/00 | (2020.01) | |
| F16M 13/04 | (2006.01) | |

(52) U.S. Cl.
CPC .......... *G03B 17/561* (2013.01); *F16M 13/02* (2013.01); *B62J 11/00* (2013.01); *F16M 13/04* (2013.01)

(58) Field of Classification Search
CPC .............................. G03B 17/561; F16M 13/02
See application file for complete search history.

(56) References Cited

U.S. PATENT DOCUMENTS

| | | | |
|---|---|---|---|
| 4,763,151 A | 8/1988 | Klinger | |
| 7,988,106 B2* | 8/2011 | Carnevali | F16M 11/14 248/146 |
| 8,137,008 B1 | 3/2012 | Mallano | |
| 8,150,248 B1 | 4/2012 | Woodman | |
| 8,668,179 B2* | 3/2014 | Corn | F16M 11/14 248/346.01 |
| 9,033,596 B2 | 5/2015 | Samuels | |
| D754,272 S | 4/2016 | Samuels | |
| 9,400,082 B2* | 7/2016 | Webster | G03B 17/561 |
| 9,507,245 B1* | 11/2016 | Druker | G03B 17/566 |
| 9,509,889 B2 | 11/2016 | Reid | |
| 9,568,145 B2* | 2/2017 | Carnevali | F16M 11/14 |
| D785,072 S | 4/2017 | Taylor et al. | |
| 9,625,791 B2 | 4/2017 | Harrison | |
| 10,139,708 B2 | 11/2018 | Stein | |
| 10,539,858 B2 | 1/2020 | Clearman | |
| 10,547,769 B2 | 1/2020 | Harrison | |
| 10,642,133 B2 | 5/2020 | Clearman | |
| 2007/0152117 A1* | 7/2007 | Byrd | F16M 13/00 248/187.1 |
| 2015/0177597 A1 | 6/2015 | Harrison et al. | |
| 2015/0301559 A1* | 10/2015 | Wu | F16M 11/041 248/229.16 |

OTHER PUBLICATIONS

Brent "Mounting a GoPro Cam to Helmets Without Large Flat Surfaces", 49ccSCOOT.com forum post at https://49ccscoot.proboards.com/thread/24195/mounting-gopro-helmets-large-surfaces (Year: 2018).*
3M VHB Tape 5952 Datasheet (Year: 2022).*

* cited by examiner

*Primary Examiner* — Leon W Rhodes, Jr.
(74) *Attorney, Agent, or Firm* — Mark V. Loen

(57) ABSTRACT

The embodied invention is a mounting assembly comprising an attaching bracket, a moldable base with a bending metal insert, and a foam attaching tape. The moldable base is conveniently formed to match the curved surface shape, and the foam tape utilizes a pressure sensitive adhesive to bond to the curved surface.

4 Claims, 7 Drawing Sheets

MOLDABLE AND FLEXIBLE MOUNT FOR A CURVED SURFACE

CROSS REFERENCE TO RELATED APPLICATIONS

Not applicable

STATEMENT REGARDING FEDERALLY SPONSORED RESEARCH OR DEVELOPMENT

Not applicable.

BACKGROUND OF THE INVENTION

(1) Field of the Invention

This invention is directed to improvements in mounting technology for active personnel, where mounting a useful communication accessory or camera is conveniently attached to a curved surface of equipment such as a helmet, bicycle, or motorcycle.

(2) Description of Related Art

Active people pursue hobbies such as biking, running, motorcycling, climbing, boating, etc. and often desire to record their personal adventures, and share them with others. Those that do strongly desire to have an 'eye view' record of their activity, recording what they saw. To this end, active cameras have been developed that can be mounted to a helmet or a bicycle handlebar. However, there are problems with attaching to these kind of curved surfaces, and the vibration and stresses encountered are usually significant, causing bonding failures. Downhill mountain bike riding, for example, will challenge any bonding between a camera and a curved surface.

Active people also want to coordinate their activities with others, and communicate by personal radio. They desire to use microphones and headsets with significant range, as cell phone connections are problematical in remote areas.

It is desirable to bond cameras and personal communication equipment to a variety of curved surfaces. The current art methods for bonding are largely based on flat surfaces.

BRIEF STATEMENT OF THE INVENTION

The embodied invention is a mounting assembly comprising an attaching bracket, a moldable base, and a foam attaching tape. The moldable base is conveniently formed to match the curved surface shape, and the foam tape utilizes a pressure sensitive adhesive to bond to the curved surface.

DETAILED DESCRIPTION OF THE INVENTION

An important goal of the embodied invention is to provide improved adhesion to a curved surface. To that goal, the mount includes an adhesive base comprising a molded base and a foam adhesion strip that is used to bond to the curved surface. The molded base includes a bendable insert (made from a bendable metal such as stainless steel) which allows the molded base to be bent by hand to a particular curved shape. This allows the adhesion to the curved surface be evenly distributed for a variety of curved or cupped shapes. The foam adhesive provides bonding to the curved surface using a pressure sensitive adhesive.

FEATURES SHOWN THE FIGURES

Figure 1:
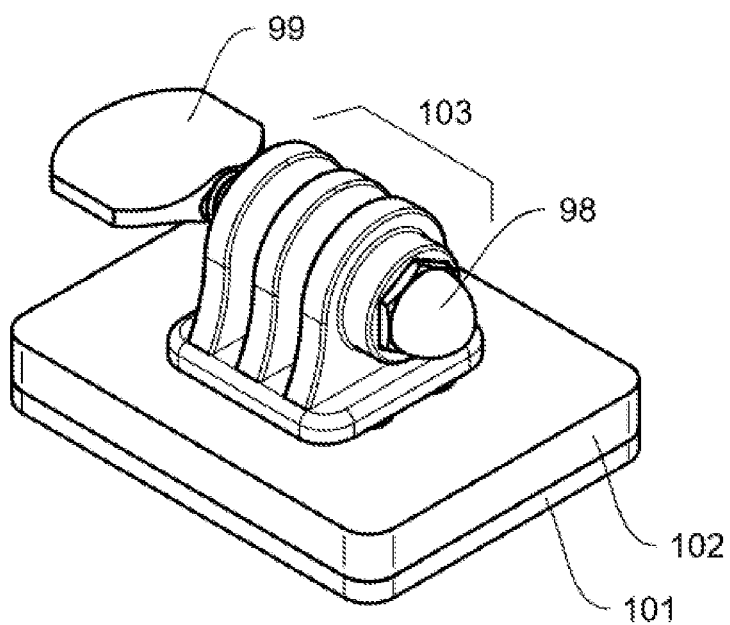
FIG. 1 shows the mounting assembly in perspective view.

98 Cap Nut
99 Thumb Screw
101 Foam Adhesive Tape (or strip)
102 Moldable Base
103 Attaching Bracket (for camera, microphone, headset)
121 Hex Nut Retention Chamber
122 Bracket Base
123 Screw Receptacles
124 Bracket Ribbing
125 Bendable Insert for Moldable Base
126 Screw Through Holes for Moldable Base
127 Screws
131 Bending Tab on SS Bending Insert
132 Screw Through Hole on SS Bending Insert
133 Cutout (reduce stiffness) on SS Bending Insert
141 Camera
142 Helmet
151 Bicycle handle bar
701 Curved pipe used in test
702 Flexible mount assembly
703 Connecting member
704 Force gauge
705 Applied lifting force FIG. 1 shows the mounting assembly. A cap nut and thumb screw are also shown. Foam adhesive tape 101 is used to bond the assembly to a curved surface. Prior to bonding, a non-adhering protective tape (not shown) is used to protect the pressure sensitive adhesive (on the bottom surface) from inadvertently bonding during storage. A moldable base 102 is bonded to the foam adhesive tape by a high strength chemical bond, such as a cross linked polymer.

The moldable base is connected to bracket ribbing 103, which is used to connect to a matching mounting bracket on the item to be attached. For example, a camera, microphone, or music speaker will have a matching ribbed bracket already installed. A thumbscrew 99 and a cap nut 98 are used to tighten the rib mount against the matching ribbed bracket.

Figure 2:
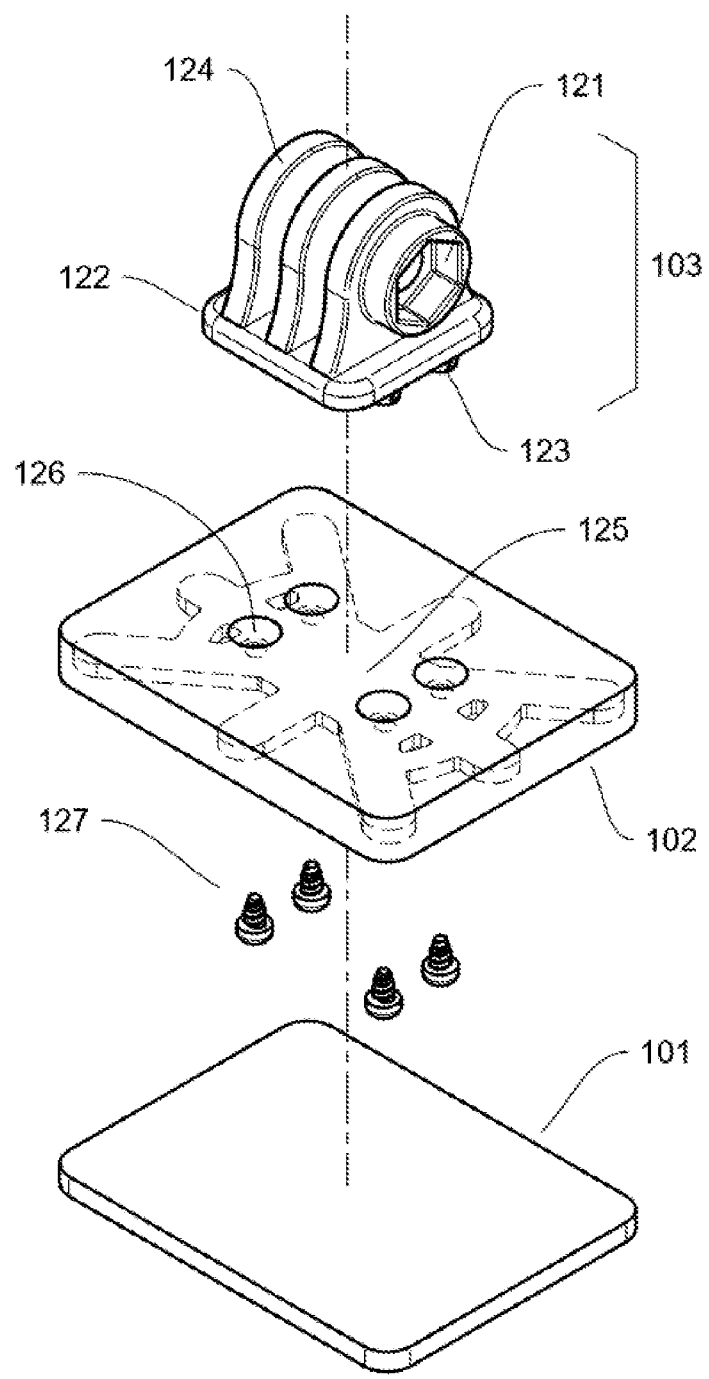
FIG. 2 shows an exploded view of the mounting assembly.

FIG. 2 shows the mounting assembly. The ribbed mount 103 further comprises ribbing 124, a bracket base 122, screw thread hole projections 123, and a hex nut chamber 121. The hex nut chamber 121 is used to prevent the cap nut from rotating when a tightening screw is turned. The base connects the screw thread hole projections 123 and the bracket ribbing 124.

The screw thread projections 123 are inserted into the through holes 126 of the moldable base 102, which center the ribbed mount 103 over the moldable base. This also keeps the ribbed mount firmly attached to the moldable base when the moldable base is flexed and bent to match a curved mounting surface. Screws 127 connect the ribbed mount 103 to the moldable base 102.

Figure 3A:
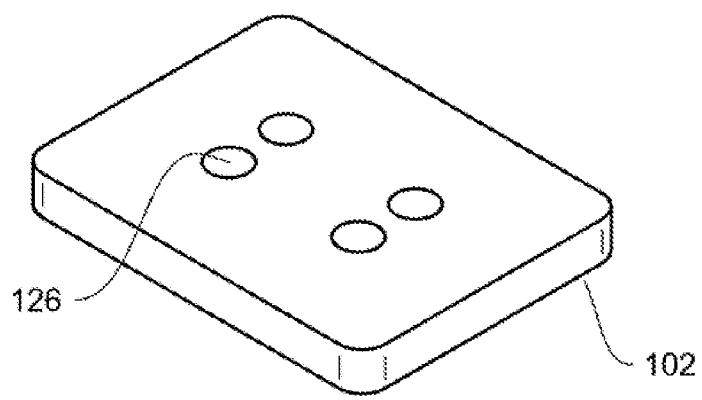
FIGS. 3A-3C show details of the moldable base.

FIG. 3A shows the through holes 126 in the moldable base 102. The pattern and number of through holes shown is only one example. At least two holes are needed, however.

Figure 3B:
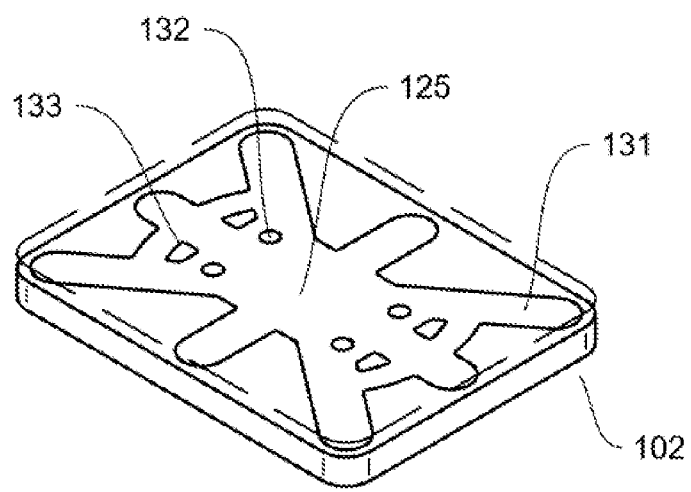
Figure 3C:
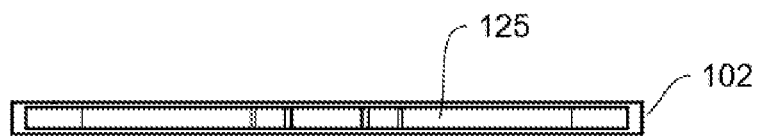

FIG. 3B shows how the metal bendable insert 125 is fitted into the molded base 102 by a view with a top portion of the molded base thickness removed. Preferably, the bendable insert 125 is fitted into the molded base 102 and completely encompassed by the flexible silicon compound used. Also, is preferably centered inside the molded base 102 as shown in FIG. 3C. The bendable insert 125 includes various bending tabs 131 as well as cutouts 133 that improve bendability by reducing the stiffness of the insert. In this example, six bending tabs are used. Through holes 132 allow the screws (127 in FIG. 2) to pass through.

Preferably, the bendable insert is made from stainless steel, and about 1.5 mm thick. The molded base is preferably about 5 mm thick.

Figure 4:
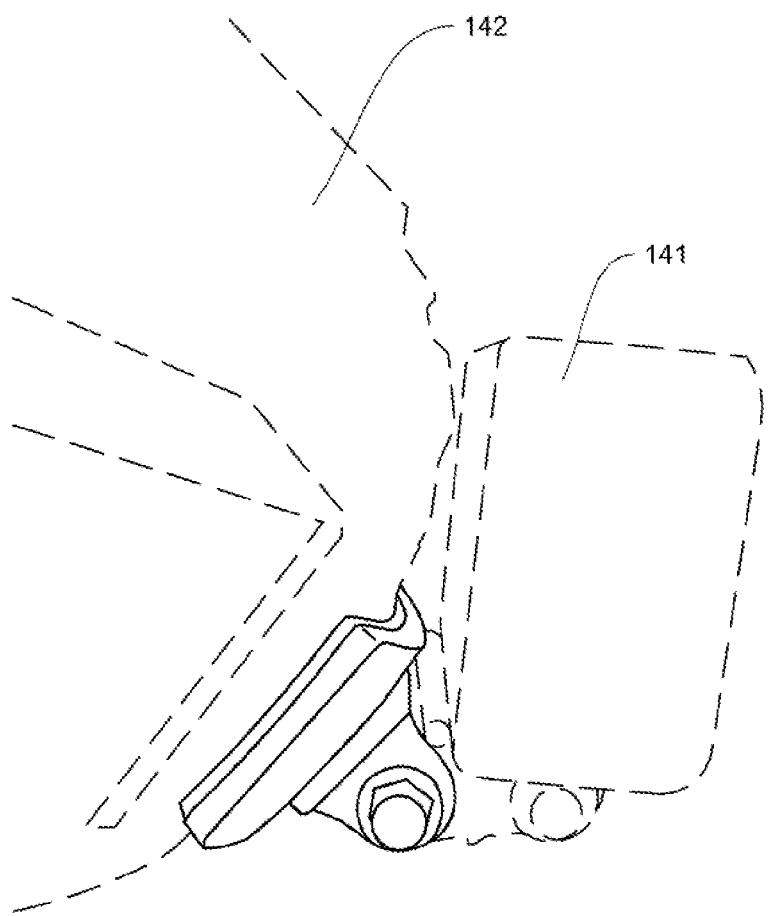
FIG. 4 shows the mounting assembly when attached to a curved helmet.
Figure 5:
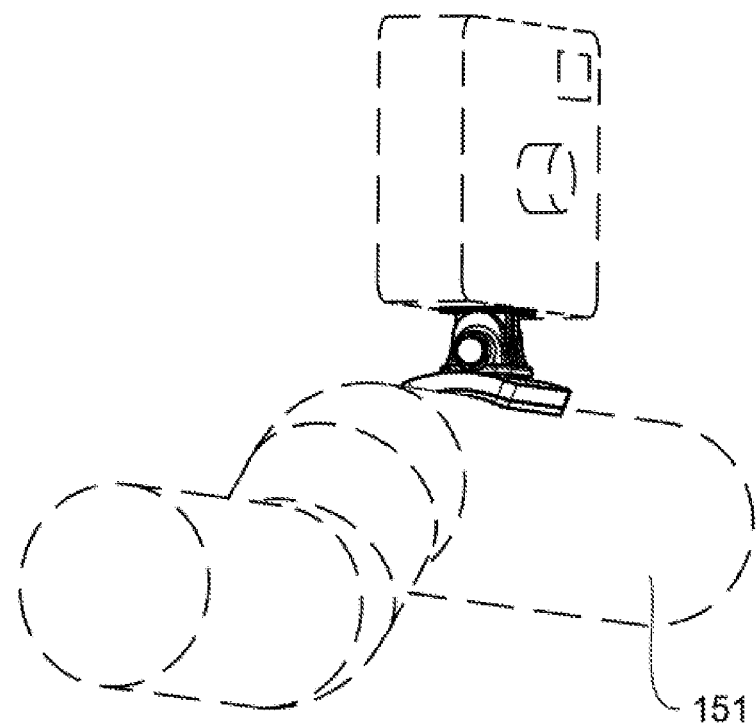
FIGS. 5 and 6 shows the mounting assembly when attached to a curved bicycle/motorcycle handle.
Figure 6:
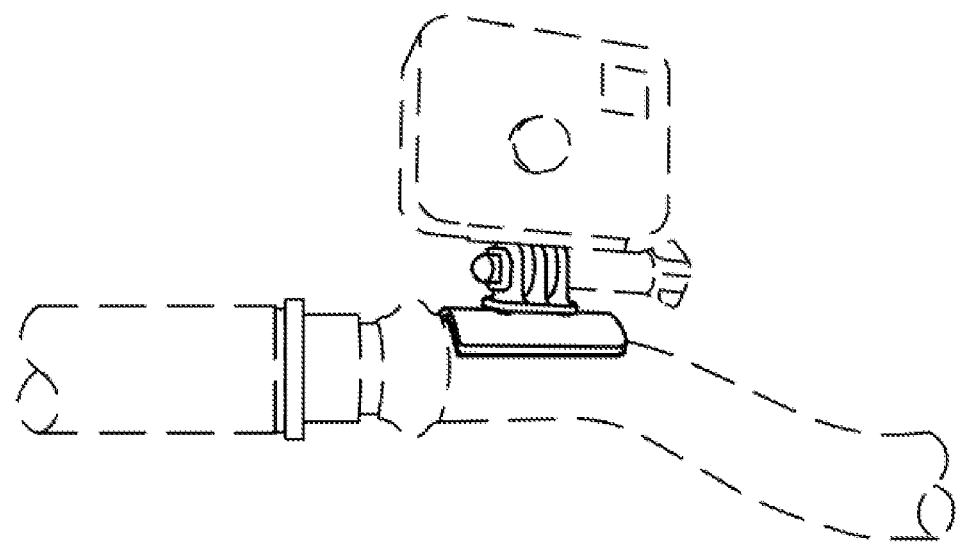

FIG. 4 shows the bendable mount assembly in use when a camera 141 is attached to the chin area of a helmet 142. Similarly, FIG. 5 shows the bendable mount assembly when attaching a communications device or GPS route display on a handle bar 151. Additionally, FIG. 6 shows the bendable mount assembly when attached to a motorbike handle bar.

In use, the mount assembly is applied to the curved surface by finger pressure, and the pressure sensitive bonding of the foam adhesive tape to the curved surface creates the bonding needed to hold the bracket mount assembly. To improve adhesion to the curved surface, the moldable base is preferably bent by fingers to match the curved surface. This is usually done by simple pressure prior to removing the protective non-bonding strip on the foam adhesive tape. When the user is ready to adhere the mount assembly to the curved surface, the non-binding strip is removed and the base is applied to the curved surface by even finger pressure.

Figure 7:
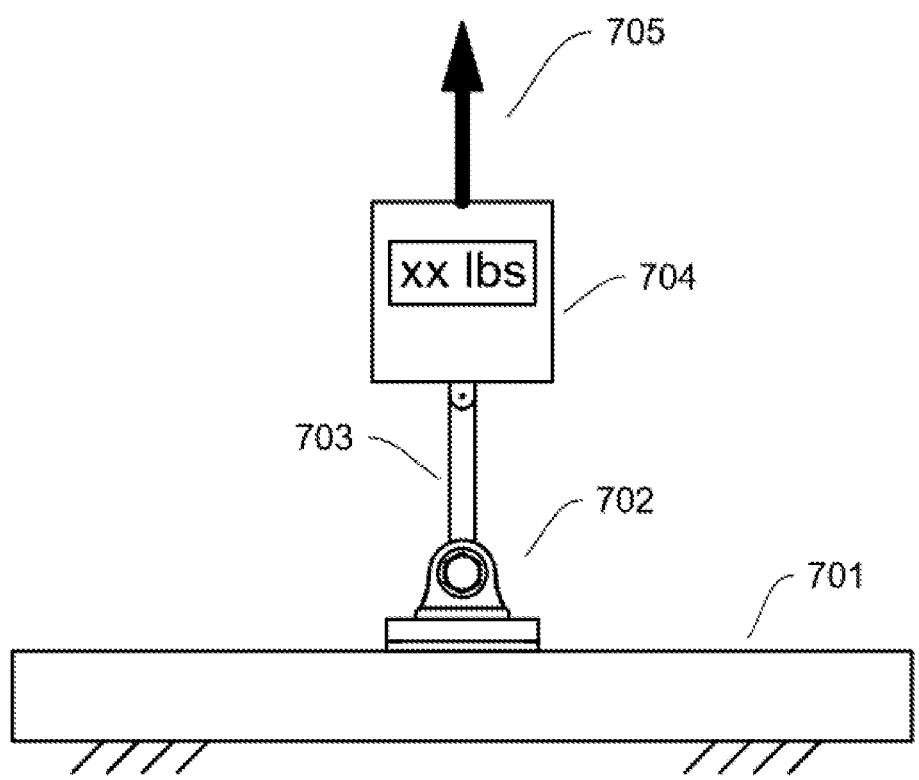
FIGS. 7 and 8 show an adhesive test setup and results when subjecting the bendable mount assembly to an adhesive separating force.

FIG. 7 shows a simple experimental setup to determine the mounting strength of the embodied invention to determine when it fails. In FIG. 7 a pipe 701 of varying diameters is rigidly held in place. The bendable mount assembly 702 is attached to the upper surface of the pipe using the foam adhesive tape. A connecting member 703 attaches to the thumb screw of the mount and also a force measuring instrument with a direct readout of lbs. Such force measuring devices are known in the art for luggage weight checking, among other items, and are very affordable. The separating force 705 was generated by a simple pulley and rope (not shown).

An experiment was conducted to determine any improvement in adhesive failure when compared to a similar designed mount assembly that was both rigid and flat. That is, an assembly that does not mold around a curved surface except to the extent the adhesive foam tape adapts to a curved surface. Curved pipes were used for create the curved surface.

Figure 8:
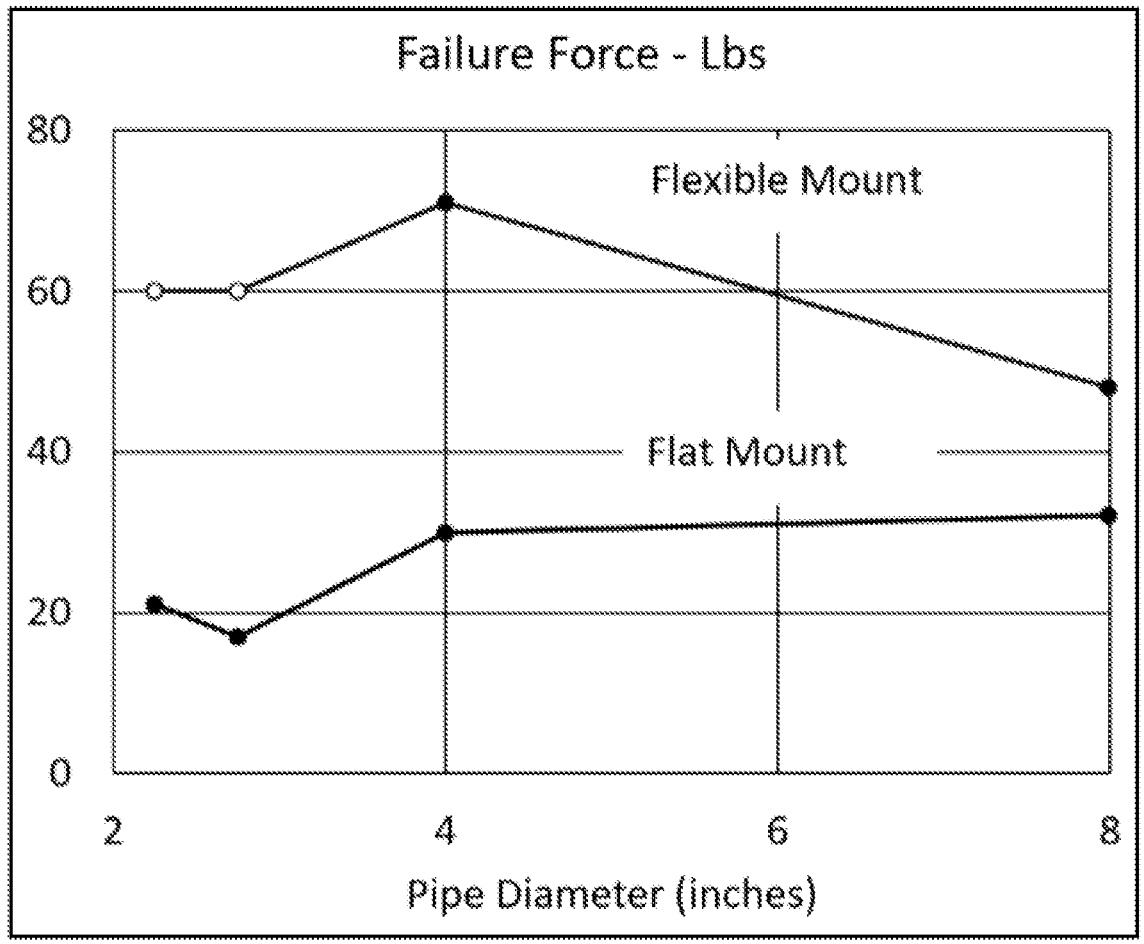

FIG. 8 shows the results of the experiment of both the flexible and inflexible (flat) mounts. The maximum failure force for both designs was largely due to the adhesive failure of the foam tape. However, the two unfilled points on the flexible mount indicate that the screws failed, rather than the adhesive tape.

As shown, the flexible mount clearly has superior adhesive capability, but the improvement lowers for larger diameter pipes, meaning the surface is less curved. Significantly, for smaller diameter pipes, the flexible mount has about three times the adhesive strength of the inflexible mount. This is a very significant improvement in the art.

The bending goal is to achieve a uniform thickness of the foam adhesive tape when the bonding is completed. By having a reasonably uniform thickness, the lifting tensile stress throughout the foam tape is equalized and maximized. Stress concentrations are avoided which improves the overall robustness of the adhesion.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. A mounting assembly for use on a curved surface, comprising:
   A) an attaching bracket comprising:
      a) a bracket base,
      b) a plurality of bracket ribs connected to said bracket base,
      c) a nut retention chamber located on a single said bracket rib,
      d) a hole through said plurality of bracket ribs and said nut retention chamber,
   B) a base assembly comprising:
      a) a moldable base having a substantially rectangular shape with a base thickness,
      b) said moldable base made from a flexible silicon compound,
      c) a bendable insert located within said moldable base,
      d) a foam adhesive tape having a pressure sensitive adhesive on one side and a bonding surface on the other side,
      e) said foam adhesive tape having a substantially uniform thickness,
      f) said foam adhesive tape having a shape that is substantially equal to said moldable base,
      g) said foam adhesive tape is connected to said moldable base by a chemical bond,
   C) said attaching bracket is connected to said base assembly by a plurality of screws, and
   D) whereby
      a) said base assembly is bonded to said curved surface by use of said foam adhesive tape and by bending said moldable base and said insert to substantially match said curved surface, and
      b) said attachment of said mounting assembly to a curved surface having a curvature radius of 2.5 inches or less has a tensile attachment force of at least 60 lbs force.

2. The mounting assembly according to claim 1, wherein said bendable insert further comprises six bending tabs, each said bending tab being rectangular in shape and having a rounded distal termination.

3. The mounting assembly according to claim 2, wherein each said bending tab extends from a proximal center shape and said six bending tabs are symmetrically arranged and centered within said moldable base.

4. The mounting assembly according to claim 1, wherein said attachment of said mounting assembly to a curved surface having a curvature radius of 1.125 inches has a tensile attachment force of at least 60 lbs force.

* * * * *